Jan. 29, 1946.  M. R. XIMENEZ  2,393,947
HARD SURFACING OF MINERAL FIBER
Filed Aug. 4, 1942
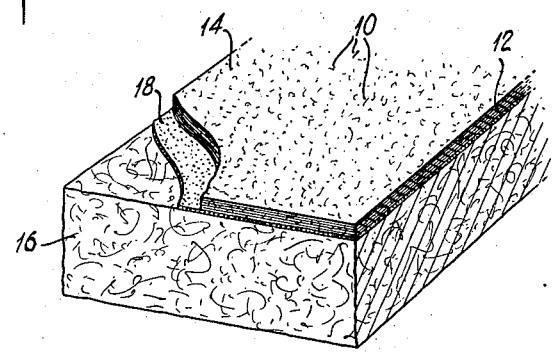
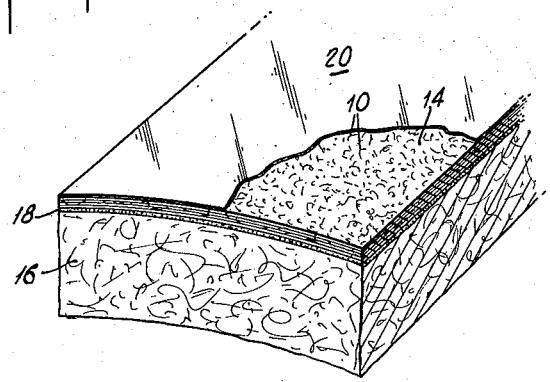
INVENTOR
MANUEL R. XIMENEZ.
BY
ATTORNEY Patented Jan. 29, 1946

2,393,947

UNITED STATES PATENT OFFICE 2,393,947

HARD SURFACING OF MINERAL FIBER

Manuel R. Ximenez, Plainfield, N. J., assignor to Johns-Manville Corporation, New York, N. Y., a corporation of New York Application August 4, 1942, Serial No. 453,567

2 Claims. (Cl. 154—28)

The present invention relates to thermal insulation and, more particularly, to the hard surfacing and reinforcing of mineral wool insulation to adapt it for lining the walls and ceilings of buildings, the hulls of ships, and for similar purposes where mechanical strength and a mar-resistant and attractive external surface is desired, together with fire- and heat-resistance, low thermal conductivity, and moderate flexibility.

The heat insulating properties of mineral wool insulation result from the insulating effect of the dead air which is trapped in the pores or interstices between the loosely associated mineral fibers. Since the thermal conductivity of this material is inversely proportional to its density, a mineral fiber batt or felted sheet of a shape and size convenient for application to a surface to be insulated possesses very low mechanical strength and is easily compressed and compacted, with resulting loss of insulating value.

An object of the present invention is to provide a composite body of mineral fiber insulation which shall have a continuous, hard, strong, flameproof, decorative, thin and flexible external surface layer of relatively low thermal conductivity, superposed on and attached to a mechanically weak, relatively thick mineral wool batt of high insulation efficiency.

Another object of the invention is to provide a thin insulating cover sheet for mineral wool batts or felted sheets with sufficient strength and rigidity to support and maintain the mineral fibers in their original porous, high insulating condition and having sufficient flexibility to allow application of the composite unit by cementing, nailing, or other suitable fastening to moderately curved, as well as flat, wall surfaces.

Another object of the invention is to provide such a cover for mineral fiber batts and felts which is water- and grease-resistant, possesses high heat stability, and provides a surface sufficiently adherent to permit cementing to the underlying batt and to permit application thereto of finishing coats of paint, enamel, varnishes or lacquers.

Still another object of the invention is to provide a hard surfacing cover for mineral wool batts and felts, possessing sufficient toughness to resist marring by flexing, compression and puncture strains, and providing sufficient reinforcing strength to protect the composite article against damage in handling and service and to adapt it for structural purposes.

In order to strengthen mineral wool bats without substantially detracting from the high heat insulating properties thereof, one feature of the present invention contemplates use of asbestos paper laminates of 2 to 4 ply thickness bonded with thermo-setting resin as the preferred reinforcing cover of the composite insulating element. A thermo-setting resin is necessary to impart strength and heat stability to the composite element. A phenol-formaldehyde type of thermo-setting resin is the preferred bonding agent for the asbestos paper laminate because of the inherent high strength and chemical and heat stability of laminates bonded therewith. However, ordinary laminates bonded by conventional methods with thermo-setting phenolic resins have certain undesirable characteristics, such as brittleness, inflammability, high cost, and possession of a surface, both before and after curing, which affords no adherent base either for cements or for finishing coats of paint, enamel, or varnish. Such characteristics of phenol-formaldehyde-bonded laminates would militate against their use in a product and process of the present invention, were it not for the discovery that by limiting the proportion of phenolic resin bonding agent with which the asbestos paper laminate is impregnated within very low and definite proportions, and by plasticizing the resin with a comparatively high proportion of tri-cresyl phosphate flameproofing and flexibilizing agent, it is possible to produce a reinforcing cover with all of the desirable characteristics heretofore mentioned.

A still further object of the invention is to provide a simple and economical method of producing strong and flexible 2 to 4 ply asbestos paper laminates bonded with flameproofed phenolic resins in amounts adjusted to provide hard surfaces which afford an adherent base for cements, paints, and enamels.

With the above and other objects and features in view, the invention consists in the improved method of hard surfacing mineral fiber insulation, and in the product thereby produced, as hereinafter described and more particularly defined in the accompanying claims.

In the following description reference will be made to the attached drawing, in which:

Fig. 1 presents a diagrammatic perspective view, with parts broken away, showing a mineral wool batt having cemented to a face thereof a resin bonded asbestos paper laminate; and Fig. 2 presents in perspective the composite thermal insulation element of Fig. 1 after a surfacing coat has been applied thereto and after the element has been slightly flexed to conform to a curved surface.

The reinforcing and surfacing element of the composite thermal insulation forming the subject of this invention preferably comprises a thin 2 to 4 ply asbestos paper laminate, fibers 10 of which are bonded with not to exceed 25% by weight of the paper of a flameproofed and plasticized thermo-setting phenolic resin 12. The asbestos paper may be reinforced with vegetable fibers, such as cotton scrim, and, in some cases an asbestos fiber millboard containing up to 20% of its weight of an inorganic silicate (for example, calcium silicate) bond may replace the asbestos paper as the fiber base of the reinforcing element of the composite insulation unit.

A preferred method of impregnating the asbestos paper with the phenolic resin is by immersion of the paper in a solvent solution of the resin. A suitable resin solution for this purpose may, for example, consist of approximately 24% "A" stage phenol-formaldehyde resin, approximately 3% hexamethylenetetramine, approximately 5½% tri-cresyl phosphate plasticizer, and approximately 67½% ethyl alcohol solvent. The "A" stage phenol-formaldehyde resin is preferably proportioned to the tri-cresyl phosphate within the limits of 80%-85% resin to 15%-20% tri-cresyl phosphate in the impregnant solution. The proportion of solvent in the impregnant solution preferably lies within the range 60%-70% by weight of the impregnant. The impregnating operation is carried on in such a way as to produce a finished, bonded asbestos sheet containing resin and plasticizer in proportions within the range 20%-25% of the weight of the paper.

As previously indicated, phenolic resins are the preferred bonding agents because they are characterized by high chemical and heat stability and high bonding strength or adhesion. The phenolic resin component of the impregnant may be partially or completely replaced by a thermosetting natural resin of the gum accroides type, but gum accroides do not provide as strong or adherent bonds as do the phenol-formaldehyde resins.

In preparing the asbestos paper laminates, as well as in impregnating a single ply asbestos asbestos paper sheet or asbestos fiber millboard, impregnation is carried out by immersion of the asbestos sheet or millboard in the resin-plasticizer solution. A thin asbestos paper sheet can be suitably impregnated within a period of about 20 seconds, and the impregnation time for thicker materials may extend up to 5 minutes. After removal from the impregnation solution, the impregnated sheet is passed through a wringer, doctor knives, or press rollers to squeeze out excess impregnant. The impregnated sheet is then subjected to a drying operation for removal of solvent. Either air drying or oven drying may be employed, the oven being operated at a temperature of from 150° F. to 200° F. The dry resin-impregnated sheets leaving the drier are then built up or otherwise assembled to form a 2 to 4 ply asbestos laminate, which is then subjected to a heat and pressure cure at a temperature in the range 325°-350° F. and under a pressure of 700-900 lbs. per square inch. The heat and pressure curing of thus-impregnated 2 to 4 ply laminates can be completed within a period of 10 to 20 minutes. A single ply asbestos thus impregnated can also be cured by 3 minutes pressing, or by sets of hot calendering rolls.

Because of the presence of the tri-cresyl phosphate plasticizer in comparatively large proportions within the cured bond, and because of the comparatively low proportion of phenolic resin impregnant in the thus heat-cured asbestos paper product, the hardened surface 14 of the paper presents an adherent base for cements and finishing coats of paints, enamels, and varnishes. It is, therefore, possible to affix the heat-cured asbestos paper laminate to a mineral wool batt or felt 16 by a suitable cement 18, such as waterproofed casein glue or adhesives of the type of cellulose ether or alkyd-resin emulsions. The preferred cement is one which will set up in the cold, does not require the use of organic solvents, has comparatively high viscosity and low penetration of porous surfaces such as mineral wool batts. The cement should also develop a permanent set, possess moisture and heat stability, and have a high degree of flexibility. In affixing the resin-impregnated asbestos paper laminate cover to a mineral wool batt, an alkyd-resin emulsion, diluted with water to suitable consistency, may be either brushed, sprayed, or rolled on one surface of the laminate sheet, and the mineral fiber batt is then applied on the thus-coated laminate surface. The coated surface and the batt may be pressed together, as by steel plates or other weights, rollers, hinged screen frames, etc., to provide a good contact between the coated surface and the batt while the cement is drying. The cement will set in a few hours at room temperature, and the cementing action can be completed within a period of 20 minutes in conveyor ovens heated up to 350° F.

The last step in the manufacture of the composite insulation unit may advantageously consist in applying a baking paint or enamel 20 to the exposed surface of the reinforcing laminate sheet. This enameling operation can be readily completed under baking temperatures, since the laminate sheet, and also the cement employed in attaching the laminate to the mineral fiber batt, can readily stand baking temperatures as high as 350° F.

The asbestos paper laminate herein described has a resin content which does not exceed 25%, whereas phenolic resin-bonded laminates heretofore manufactured generally contained a minimum of 40%-50% by weight of resin on the surface sheets. Because of the lower proportion of resin and the comparatively high proportion of tri-cresyl phosphate plasticizer employed in making the laminates above described, they can be made much more simply and economically than possible with a conventional laminating process. For example, the maximum molding pressures employed in making the laminates of the present invention are from 700 to 900 lbs. per square inch, which is below the minimum limit of molding pressure employed in conventional practice.

Standard laminating practice requires the presence of small amounts of volatile constituents such as solvents and others. The presence of these is one of the reasons for the cooling of the laminating sheets within the molding press to avoid development of blisters by liberation of vapors. The residual volatile constituents are required to keep the impregnated sheets flexible enough for handling (the sheets would be brittle if bone dry), and, secondarily, to promote the flow of the resin under heat and pressure, the resulting tackiness causing the consolidation of the sheets. According to the method of the present invention, both flexibility and tackiness under heat are secured by the presence of the non-volatile tri-cresyl phosphate plasticizer, and, accordingly, the impregnated sheets are non-tacky but flexible, even when dry. Consequently, no residual solvent is required during the pressure molding operation. The tackiness under heat disappears as soon as the resin is cured, but the cured laminated sheet retains flexibility. A single ply, cured, impregnated asbestos paper sheet retains sufficient flexibility so that it can be wound on a one inch diameter mandrel.

Since, according to the present process, the impregnated laminates can be cooled after removal from the molding press, (preferably while confined under weights or mechanical pressure, as by stacking between plates used in lamination), the press time required for treatment under heat is only about one-half the press time required in conventional practice for effecting heat and pressure cure, followed by cooling under pressure. The presence of tri-cresyl phosphate in the cured sheets provides a lubricant allowing removal of the laminates from the press while hot at the end of the short curing cycle. When phenolic resin impregnated laminates are cooled within the molding press after the heat and pressure cure has been completed, the laminate is more brittle than one of comparable composition which has been cooled after removal from the press. The thus prolonged period of high temperature to which the laminate is exposed during slow curing within the press has a weakening and embrittling effect on any reinforcing cotton fibers, and this prolonged high temperature exposure also tends to promote sticking of the laminates and breaking down of asbestos fiber bundles under the pressure of the press. This tendency to develop stickiness tends to increase when molding pressures above 1,000 lbs. per square inch are employed. Such high pressures cause excessive flow of resin, and this excessive resin flow also tends to break down asbestos fiber and reinforcing cotton scrim.

As previously indicated, resin-bonded laminates, even phenolic resin bonded asbestos paper or asbestos cloth laminates, are not flameproof. The phenol-formaldehyde resin impregnants normally contain no fire-retardants and, even worse, they may contain a small percentage of a drying oil. The laminated asbestos paper sheets of the present invention require the presence of a high percentage of plasticizer in the bond, and the preferred plasticizer, tri-cresyl phosphate, is one of the best fire-retardant liquid plasticizers available.

The surfaces of fiber paper laminates which have been bonded with phenol-formaldehyde resin by conventional impregnation methods are of such smooth texture that they have no adhesion for paint or other finishes or for cement. The only way that such laminates can be consolidated with, and cemented to, other surfaces, such as in the manufacture of presswood, is by effecting the consolidation under heat and pressure, and after special treatment such as a specially treated back ply. Laminated asbestos sheets made in accordance with the present invention can be cemented with a suitable cement to any surface, either before or after curing; and the surfaces thereof can be attractively finished with any of the common water, oil, or synthetic resin paints, varnishes, or enamels by any method of application and without any bleeding effect.

If conventional methods of high pressure molding were employed in the manufacture of the thin 2 to 4 ply asbestos paper laminates of the present invention, using conventional high proportions of resin, the heavy flow of resin developed at conventional molding heats and pressures would have the effect of breaking the bond between the asbestos paper and any reinforcing scrim, with resulting distortion of the asbestos paper-scrim laminate. On the other hand, asbestos paper laminates (with or without scrim or fiber reinforcement), made at the lower laminating pressures employed in accordance with the present invention, and with the lower resin proportions, retain their texture during the molding and curing operation.

The hard surfaced composite thermal insulation elements which form the subject of the present invention possess a high degree of mechanical strength and resistance to marring or distortion by impact and puncture, while at the same time retaining sufficient flexibility to allow of their adaptability to cover curved surfaces, such as ship hulls. Furthermore, the exposed hard surface of composite insulation is adapted for taking an attractive finish and can, therefore, serve as the inner wall lining or ceiling for a room or chamber. The impregnated asbestos paper sheet laminate or millboard is flameproof, and possesses good heat insulating value. It is also substantially waterproof, can be rendered completely waterproof and washable by a suitable waterproof finish or coating, and the composite unit therefore possesses and retains its high insulation characteristics. The composite unit can be safely shipped in assembled form and can be conveniently and readily cut to size to fit any specific building operation.

What I claim is:

1. The process of manufacturing a hard surfaced, somewhat flexible facing sheet which comprises, impregnating asbestos fiber paper with a solvent solution of thermo-setting phenolic resin binder plasticized with 15%–20% of tri-cresyl phosphate, limiting the amount of plasticized resin binder retained by the paper within the range 20%–25% by weight of the paper, drying the paper to evaporate all the solvent, building up a 2 to 4 ply laminate of thus-impregnated sheets, curing the laminate for 10 to 20 minutes at a temperature of 325°–350° F. and under a pressure of 700–900 lbs. per square inch, immediately removing the bonded laminate from the pressure curing zone, and thereafter cooling it to the normal temperature while confining under weights.

2. A hard surfaced, flexible facing sheet having varnish and cement adherent surfaces, comprising 1–4 ply asbestos paper impregnated and bonded with between 20% and 25% of its weight of heat and pressure cured phenolic resin, said resin containing 15–20% by weight of tricresyl phosphate, and the individual plies of said resin impregnated paper having sufficient flexibility to withstand winding on a one-inch diameter mandrel.

MANUEL R. XIMENEZ.